(12) United States Patent
Oh et al.

(10) Patent No.: US 9,702,430 B2
(45) Date of Patent: Jul. 11, 2017

(54) APPARATUS FOR DAMPING OF FLYWHEEL

(71) Applicant: HYUNDAI MOTOR COMPANY, Seoul (KR)

(72) Inventors: Wan Soo Oh, Yongin-si (KR); Heung Seok Lee, Seoul (KR); Yong Wook Jin, Suwon-si (KR); Jae Woong Hwang, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/210,364

(22) Filed: Jul. 14, 2016

(65) Prior Publication Data

US 2016/0319901 A1    Nov. 3, 2016

Related U.S. Application Data

(62) Division of application No. 13/913,298, filed on Jun. 7, 2013, now abandoned.

(30) Foreign Application Priority Data

Dec. 6, 2012  (KR) ........................ 10-2012-0141419

(51) Int. Cl.
*F16F 15/134* (2006.01)
*F16F 15/30* (2006.01)

(52) U.S. Cl.
CPC ............ *F16F 15/134* (2013.01); *F16F 15/30* (2013.01); *Y10T 74/2131* (2015.01)

(58) Field of Classification Search
CPC ...... F16F 15/134; F16F 15/30; Y10T 74/2131
See application file for complete search history.

(56) References Cited

U.S. PATENT DOCUMENTS 5,088,964 A * 2/1992 Kuhne .............. F16F 15/13446
192/208
5,826,689 A    10/1998 Bochot
(Continued)

FOREIGN PATENT DOCUMENTS

JP    2011-522190 A    7/2011
KR   10-2002-0043925 A    6/2002
(Continued)

OTHER PUBLICATIONS

EPO Machine Translation of KR 20070109196, Kang et al., Nov. 2007.*

(Continued)

*Primary Examiner* — Vinh Luong
(74) *Attorney, Agent, or Firm* — McDermott Will & Emery LLP

(57) ABSTRACT

An apparatus for damping of a flywheel, which is configured so that a second mass may rotate in a direction for offsetting torsional vibration of an engine transmitted to a first mass through a damping spring. The apparatus includes: guides disposed between damping springs and guiding the damping springs extending/contracting in a rotational direction by a damping operation; and a third mass arranged coaxially with the second mass, with one end connected to the guide, and relatively rotating in a direction for offsetting torsional vibration of the engine transmitted to the second mass.

2 Claims, 4 Drawing Sheets

(56) References Cited

U.S. PATENT DOCUMENTS

| | | | |
|---|---|---|---|
| 6,047,804 A * | 4/2000 | Feldhaus | F16F 15/13178 |
| | | | 192/213.2 |
| 8,062,135 B2 | 11/2011 | Letzer et al. | |
| 9,371,886 B2 * | 6/2016 | Yoon | F16F 15/13469 |
| 2002/0019263 A1 * | 2/2002 | Jackel | F16F 15/1343 |
| | | | 464/67.1 |
| 2004/0185939 A1 | 9/2004 | Jee | |
| 2012/0031225 A1 * | 2/2012 | Fafet | F16D 3/77 |
| | | | 74/574.4 |
| 2012/0048057 A1 | 3/2012 | Fafet et al. | |
| 2014/0157945 A1 | 6/2014 | Oh et al. | |
| 2015/0260257 A1 | 9/2015 | Jimenez Perez Mitre et al. | |
| 2015/0276012 A1 * | 10/2015 | Kawazoe | F16F 15/13484 |
| | | | 464/68.2 |

FOREIGN PATENT DOCUMENTS

| | | |
|---|---|---|
| KR | 10-0371118 B1 | 11/2003 |
| KR | 20070109196 A * | 11/2007 |
| KR | 10-2009-0100331 A | 9/2009 |
| KR | 10-2012-0001514 A | 1/2012 |
| WO | 2007/062620 A1 | 6/2007 |

OTHER PUBLICATIONS

Machine Translation of KR 10-2009-0100331, Hur, Sep. 2009.
Translation of KR 10-2012-0001514, Chang-Ho Bae, Jan. 2012.
Translation of Korean Patent Office Action. Application No. 10-2012-0141419, Jan. 13, 2014.
Mass—Wikipedia, the free encyclopedia; en.wikipedia.org/wiki/Mass Jul. 8, 2015.
Korean Office Action issued in Korean Application No. 10-2012-0141419 dated Jan. 13, 2014.
Non-Final Office Action dated Jul. 13, 2015, issued in U.S Appl. No. 13/913,298.
Final Office Action dated Oct. 26, 2015, issued in U.S. Appl. No. 13/913,298.
Non-Final Office Action dated Feb. 16, 2016, issued in U.S. Appl. No. 13/913,298.

* cited by examiner

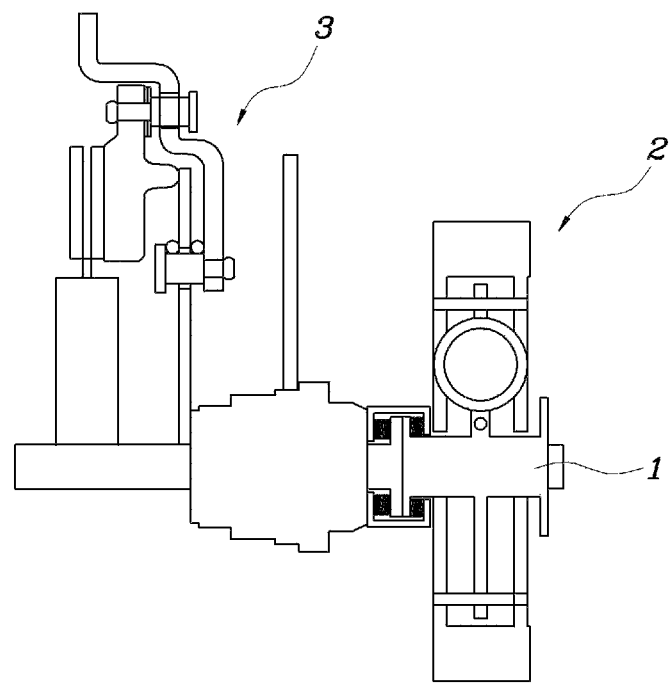
FIG. 1    --Prior Art--
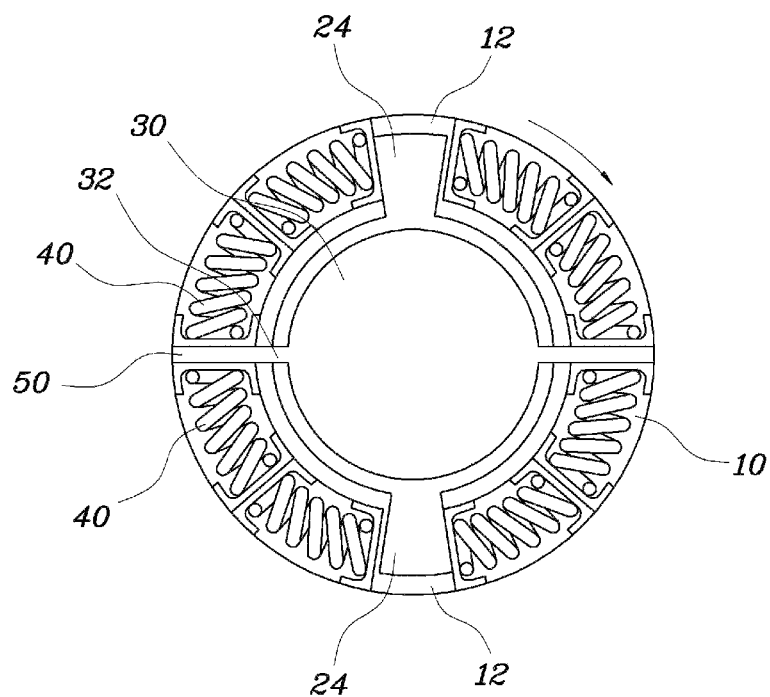
FIG. 2

APPARATUS FOR DAMPING OF FLYWHEEL

CROSS-REFERENCE TO RELATED APPLICATION

This application is a divisional of U.S. patent application Ser. No. 13/913,298 filed Jun. 7, 2013, which in turn claims under 35 U.S.C. §119(a) the benefit of Korean Patent Application No. 10-2012-0141419 filed on Dec. 6, 2012, the entire contents of which are incorporated herein by reference.

BACKGROUND (a) Technical Field

The present disclosure relates to an apparatus for damping of a flywheel, and more particularly, to an apparatus for damping of a flywheel that effectively attenuates torsional vibration of an engine while preventing the entire length of a transmission from increasing by adding a mass to a dual mass flywheel structure.

(b) Background Art

In general, there is always imbalance of a driving force due to a change in gas pressure by a piston in internal combustion engines. A torsional vibration force is generated by such an imbalance in the engines. It is preferable to make transmission of power from the engines uniform while the engines operate.

For a driving NVH, a flywheel serves to reduce the problems (e.g., traveling and idle rattling) of the NVH in the driving system by keeping the rotational speed constant using an inertia moment, and by reducing the variations in the frequency of torsional vibration transmitted from an engine.

On the other hand, recently, vehicles equipped with high-performance engines (e.g., using GDI, turbocharger, supercharger, twinturbo, etc.) are being competitively developed and brought into the market, and particularly, it is being attempted to use a high-torque engine in a low-speed section to solve the defect related to a feeling of departure (feeling of direct driving), which is a vulnerable point of luxurious vehicles.

However, for such engines, aspects of NVH such as rattling and booming may be deteriorated with increased torsional vibration of the engines, and particularly, an increase of torsional vibration of the pairs of gears in a transmission may cause shock and noise to increase.

FIG. 1 shows a damping apparatus 2, according to the related art, which is separately disposed on an input shaft 1 to offset torsional vibration transmitted to the input shaft 1 using a damping spring. That is, torsional vibration from an engine that is transmitted through a clutch 3 is absorbed and reduced by the damping apparatus 2.

However, according to the related art, it is necessary to prepare a space to mount a damping apparatus to a transmission. Because the available space to mount a damping apparatus to a transmission is limited, the entire length of the transmission increases when a damping apparatus is mounted.

As related art, Korean Patent Publication No. 10-2002-0043925 entitled "Triple Mass Vibration Damping Flywheel for Vehicles" has been disclosed, but it has a problem improving torsional vibration generated in a power train with two or three cylinders.

The description provided above as related art of the present disclosure is intended only to help understand the background of the present disclosure and should not be construed as being known by those having ordinary skill in the art.

(Patent Document 1) KR 10-2002-0043925 A

SUMMARY OF THE DISCLOSURE

An object of the present disclosure is to provide an apparatus for damping of a flywheel that effectively attenuates torsional vibration of an engine while preventing the entire length of a transmission from increasing by adding a mass to a dual mass flywheel structure.

According to an aspect of the present disclosure, an apparatus for damping of a flywheel, which is configured so that a second mass may rotate in a direction for offsetting torsional vibration of an engine transmitted to a first mass through a damping spring, includes: a guide disposed between damping springs and guiding the damping springs extending/contracting in a rotational direction by a damping operation; and a third mass arranged coaxially with the second mass, with one end connected to the guide, and relatively rotating in a direction for offsetting torsional vibration of the engine transmitted to the second mass.

According to another aspect of the present disclosure, an apparatus for damping of a flywheel includes: a first mass connected with an engine and rotated by power from the engine; a second mass arranged coaxially with the first mass and relatively rotating in a direction for offsetting torsional vibration of the engine transmitted to the first mass; damping springs disposed between the first mass and the second mass, and providing an elastic force against the relative rotational displacement between the first mass and the second mass; a guide disposed between the damping springs and guiding the damping springs extending/contracting in a rotational direction by a damping operation; and a third mass arranged coaxially with the second mass, with one end connected to the guide, and relatively rotating in a direction for offsetting torsional vibration of the engine transmitted to the second mass.

According to another aspect of the present disclosure, an apparatus for damping of a flywheel, which is configured so that a second mass may rotate in a direction for offsetting torsional vibration of an engine transmitted to a first mass through a first damping spring, includes: a guide disposed between first damping springs and guiding the first damping springs extending/contracting in a rotational direction by a damping operation; a third mass arranged coaxially with the second mass, with one end connected to the guide, and relatively rotating in a direction for offsetting torsional vibration of the engine transmitted to the second mass; and a second damping spring disposed between the third mass and the guide, and providing an elastic force against the relative rotational displacement between the third mass and the guide.

According to another aspect of the present disclosure, an apparatus for damping of a flywheel, includes: a first mass connected with an engine and rotated by power from the engine; a second mass arranged coaxially with the first mass and relatively rotating in a direction for offsetting torsional vibration of the engine transmitted to the first mass; first damping springs disposed between the first mass and the second mass, and providing an elastic force against the relative rotational displacement between the first mass and the second mass; a guide disposed between the first damping springs and guiding the first damping springs extending/contracting in a rotational direction by a damping operation; a third mass arranged coaxially with the second mass, with one end connected to the guide, and relatively rotating in a direction for offsetting torsional vibration of the engine transmitted to the second mass; and a second damping spring disposed between the third mass and the guide, and providing an elastic force against the relative rotational displacement between the third mass and the guide.

The third mass may be formed in the shape of a disk and mounted to one side of the second mass.

A damping space may be formed inside the guide, a guide protrusion may be formed at an end of the third mass, and both ends of the second damping spring may be connected to inner sides of the guide protrusion and the damping space, respectively.

The apparatus may further include plural second damping springs, wherein a second damping spring may be disposed on both sides of the guide protrusion.

BRIEF DESCRIPTION OF THE DRAWINGS

The above and other features of the present disclosure will now be described in detail with reference to certain exemplary embodiments thereof illustrated in the accompanying drawings which are provided hereinbelow by way of illustration only, and thus are not limitative of the present disclosure, wherein:

FIG. 1 is a view showing a configuration in which a damping apparatus is separately disposed on an input shaft according to the related art;

FIG. 2 is a view showing the structure of a first exemplary embodiment of an apparatus for damping of a flywheel according to the present disclosure;

It should be understood that the appended drawings are not necessarily to scale, presenting a somewhat simplified representation of various preferred features illustrative of the basic principles of the disclosure. The specific design features described herein, including, for example, specific dimensions, orientations, locations, and shapes, are simply non-limiting examples, and actual design features will be determined in part by the particular intended application and use environment.

Reference numbers refer to the same or equivalent parts of the present disclosure throughout the several figures.

DETAILED DESCRIPTION

Exemplary embodiments of the present disclosure are described hereafter in detail with reference to the accompanying drawings.

Figure 3:
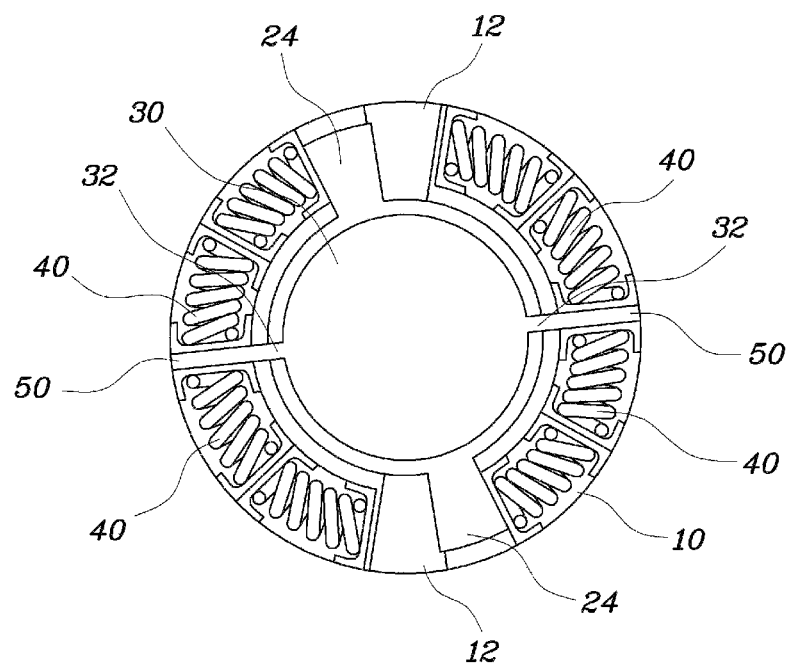
FIG. 3 is a view showing a damping operation of the damping apparatus shown in FIG. 2.
Figure 4:
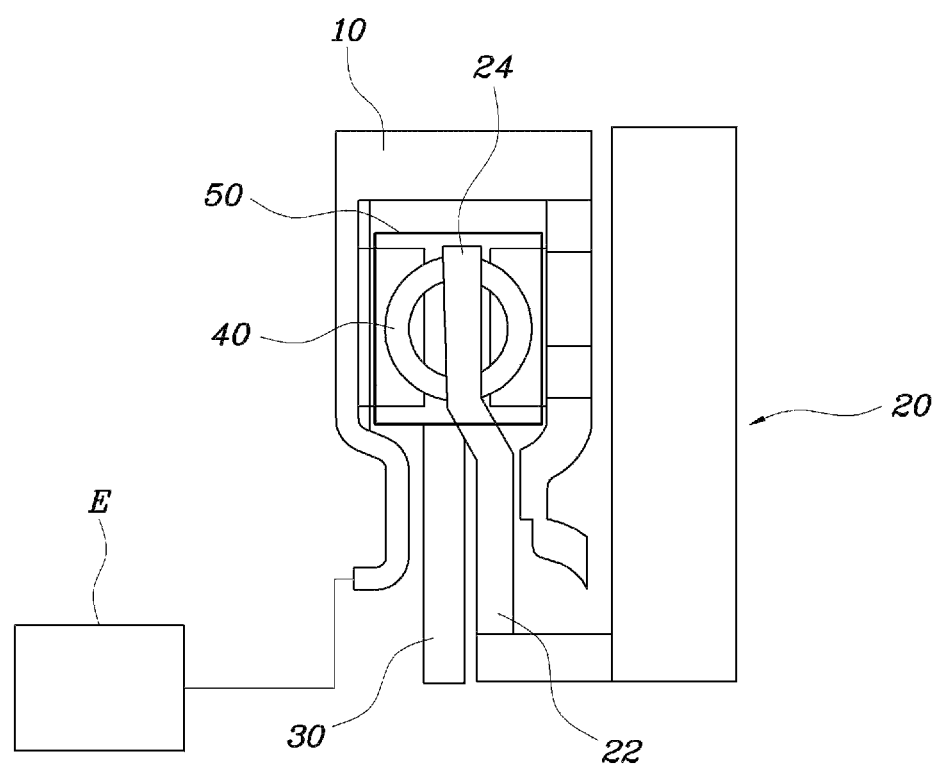
FIG. 4 is a view showing a combination structure of a third mass and guides shown in FIG. 2.

FIG. 2 is a view showing the structure of a first exemplary embodiment of an apparatus for damping of a flywheel according to the present disclosure, FIG. 3 is a view showing a damping operation of the damping apparatus shown in FIG. 2, and FIG. 4 is a view showing a combination structure of a third mass 30 and guides 50 shown in FIG. 2.

Referring to FIGS. 2 to 4, the configuration of a first exemplary embodiment of an apparatus for damping of a flywheel of the present disclosure may roughly include guides 50 and a third mass 30.

In detail, a flywheel, which is configured so that a second mass 20 may rotate in a direction for offsetting torsional vibration of an engine E transmitted to a first mass 10 through damping springs 40, may include: the guides 50 disposed between damping springs 40 and guiding the damping springs 40 extending/contracting in a rotational direction by a damping operation; and the third mass 30 arranged coaxially with the second mass 20, with one end connected to a guide 50, and relatively rotating in a direction for offsetting torsional vibration of the engine E transmitted to the second mass 20.

Further, a configuration of the first exemplary embodiment may include: the first mass 10 connected with the engine E and rotated by the power from the engine E; the second mass 20 arranged coaxially with the first mass 10 and relatively rotating in the direction for offsetting torsional vibration of the engine E transmitted to the first mass 10; the damping springs 40 disposed between the first mass 10 and the second mass 20 and providing an elastic force against the relative rotational displacement between the first mass 10 and the second mass 20; the guides 50 disposed between the damping springs 40 and guiding the damping springs 40 extending/contracting in a rotational direction by a damping operation; and the third mass 30 arranged coaxially with the second mass 20, with one end connected to a guide 50, and relatively rotating in the direction for offsetting torsional vibration of the engine E transmitted to the second mass 20.

Referring to FIGS. 2 to 3, the flywheel of the present disclosure preferably has the structure of a dual mass flywheel and the first mass 10 may be a primary flywheel.

Therefore, the first mass 10 is connected with a crankshaft (not shown) of the engine E and rotated by power from the engine E via the crankshaft. A stopper 12 is formed at both ends on the inner side of the first mass 10.

Further, the second mass 20, which may be a secondary flywheel, is arranged coaxially with the first mass 10. The second mass 20 rotates with a clutch cover mounted to one side and has a driving plate 22 fixed to the other side. Damping operation members 24 protrude in a direction of the radius of the driving plate 22 at both ends of the driving plate 22, respectively.

Further, as the second mass 20 relatively rotates in the direction for offsetting torsional vibration of the engine E transmitted to the first mass 10 by the damping springs 40, torsional vibration of the engine E can be absorbed and reduced.

The damping springs 40 are arranged on the first mass 10 in a circumferential direction, with respective one ends of the damping springs 40 supported by corresponding stoppers 12 of the first mass 10 and the other ends supported by corresponding damping operation members 24 of the driving plate 22.

Therefore, when the flywheel rotates with torsional vibration transmitted from the engine E, the damping springs 40 provide an elastic force against the relative displacement between the first mass 10 and the second mass 20.

Further, the guides 50, disposed between the damping springs 40 and guiding the extension/contraction of the damping springs 40 for damping, move in the rotational direction of the extending/contracting of the damping springs 40.

The third mass 30, arranged coaxially with the second mass 20, preferably includes guide protrusions 32 protruding from both ends of an outer side of the third mass 30. The guide protrusions 32 are connected to one of the guides 50, so that the third mass 30 may relatively rotate in the direction for offsetting torsional vibration of the engine E transmitted to the second mass 20.

A needle bearing may be disposed between the third mass 30 and the driving plate 22 of the second mass 20 in order to reduce a frictional force between the third mass 30 and the driving plate 22.

Further, the third mass 30 may be formed in the shape of a disk.

That is, as the first mass 10 fitted to the crankshaft of the engine E is rotated by a driving force from the engine E, the second mass rotates relative to the first mass 10. When the torque of the engine E changes, the damping springs 40 provide an elastic force against rotational displacement of the second mass 20 rotating relative to the first mass 10, so that the torsional vibration transmitted from the engine E can be absorbed and reduced.

In particular, the third mass 30 engages the guides 50 while rotating relative to the second mass 20, so that the guides 50 correspondingly may rotate with the third mass 30.

Therefore, the damping springs 40 disposed between the guides 50 engaging the third mass 30 and the damping operation members 24 rotating with the second mass 20 absorb and reduce torsion while contracting further than the damping springs 40 in other sections. Therefore, a low-RPM resonance generated in the power train of an engine E with two or three cylinders can be more effectively improved by the relative rotation of the third mass 30.

Figure 5:
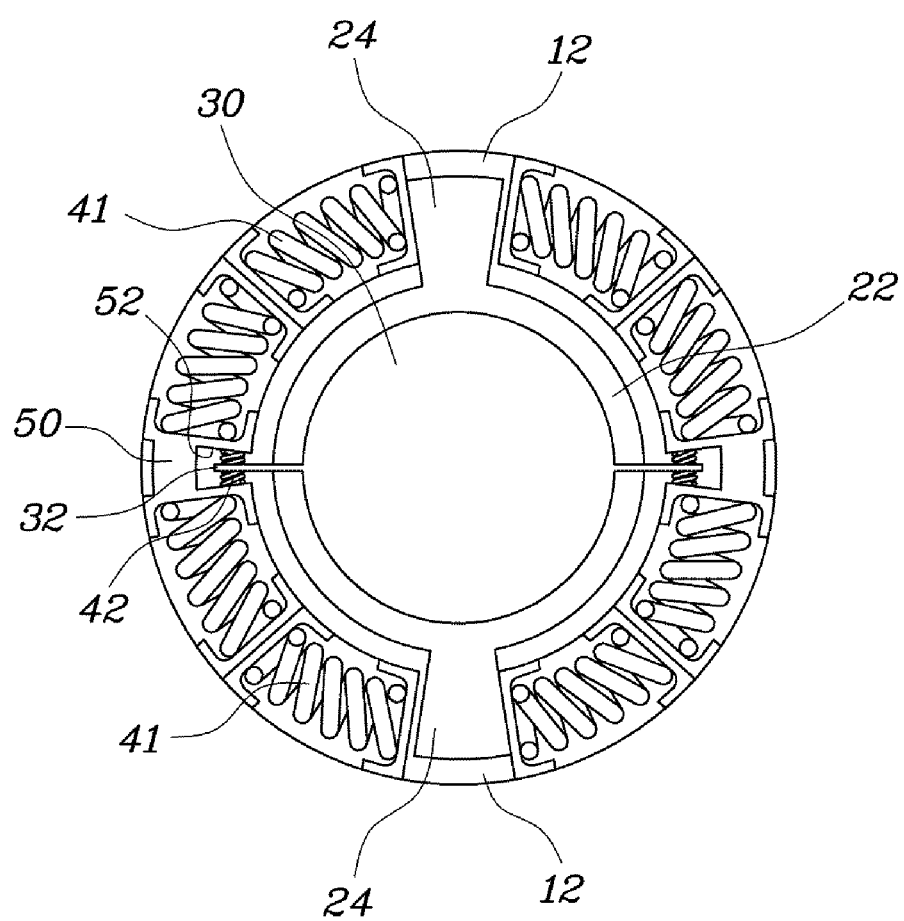
FIG. 5 is a view showing the structure of a second exemplary embodiment of an apparatus for damping of a flywheel according to the present disclosure.
Figure 6:
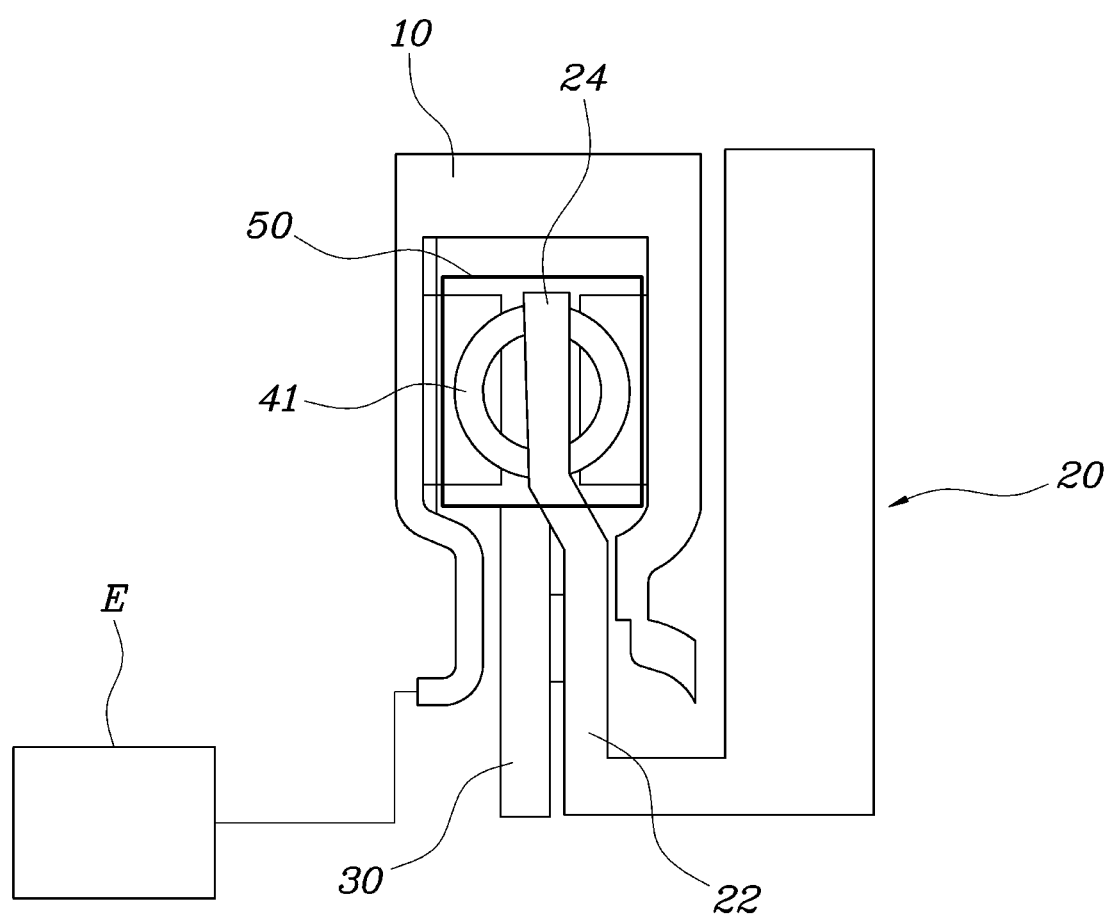
FIG. 6 is a view showing a combination structure of a third mass and guides shown in FIG. 5.

FIG. 5 is a view showing the structure of a second exemplary embodiment of an apparatus for damping of a flywheel according to the present disclosure and FIG. 6 is a view showing a combination structure of the third mass 30 and the guides 50 shown in FIG. 5.

Referring to FIGS. 5 to 6, the configuration of a second exemplary embodiment of an apparatus for damping of a flywheel of the present disclosure may roughly include guides 50, a third mass 30, and second damping springs 42.

In detail, a flywheel, which is configured so that a second mass 20 may rotate in a direction for offsetting torsional vibration of an engine E transmitted to a first mass 10 through a first damping spring 41, may include: the guides 50 disposed between the first damping springs 41 and guiding the first damping springs 41 extending/contracting in a rotational direction by a damping operation; the third mass 30 arranged coaxially with the second mass 20, with one end connected to a guide 50, and relatively rotating in a direction for offsetting torsional vibration of the engine E transmitted to the second mass 20; and the second damping springs 42 disposed between the third mass 30 and respective guides 50 and providing an elastic force against the relative rotational displacement between the third mass 30 and the guides 50.

Further, a configuration of the second exemplary embodiment may include: the first mass 10 connected with the engine E and rotated by the power from the engine E; the second mass 20 arranged coaxially with the first mass 10 and relatively rotating in the direction for offsetting torsional vibration of the engine E transmitted to the first mass 10; the first damping springs 41 disposed between the first mass 10 and the second mass 20 and providing an elastic force against the relative rotational displacement between the first mass 10 and the second mass 20; the guide 50 disposed between the first damping springs 41 and guiding the first damping springs 41 extending/contracting in a rotational direction by a damping operation; the third mass 30 arranged coaxially with the second mass 20, with one end connected to a guide 50, and relatively rotating in the direction for offsetting torsional vibration of the engine E transmitted to the second mass 20; and the second damping springs 42 disposed between the third mass 30 and respective guides 50 and providing an elastic force against the relative rotational displacement between the third mass 30 and the guides 50.

Referring to FIGS. 5 to 6, the flywheel of the present disclosure preferably has the structure of a dual mass flywheel in which the first mass 10 may be a primary flywheel and the second mass 20 may be a secondary flywheel.

The first mass 10 and the second mass 20 may have the same configurations as those of the first exemplary embodiment described above, so a description thereof is omitted here.

The first damping springs 41 are arranged on the first mass 10 in a circumferential direction, with respective one ends of the first damping springs 41 supported by corresponding stoppers 12 of the first mass 10 and the other ends supported by corresponding damping operation members 24 of the driving plate 22.

Therefore, when the flywheel is rotated by power transmitted from the engine E, the first damping springs 41 provide an elastic force against the relative displacement between the first mass 10 and the second mass 20.

Further, the guides 50, disposed between the first damping springs 41 and guiding the extension/contraction of the first damping springs 41 for damping, moves in the rotational direction of the extending/contracting of the first damping springs 41.

The third mass 30 is arranged coaxially with the second mass 20 and both ends protruding from an outer side of the third mass 30 are connected to one of the guides 50, so that the third mass 30 may relatively rotate in the direction for offsetting torsional vibration of the engine E transmitted to the second mass 20.

A needle bearing may be disposed between the third mass 30 and the driving plate 22 of the second mass 20 in order to reduce a frictional force between the third mass 30 and the driving plate 22.

Further, the third mass 30 may be formed in the shape of a disk.

The second damping springs 42, disposed between the third mass 30 and the guides 50, provide an elastic force against the relative rotational displacement between the third mass 30 and the guides 50.

The combination structure including the second damping springs 42 is described in detail below. A damping space 52 with one side open to the driving plate 22 is formed inside a corresponding guide 50 and a guide protrusion 32 is formed at an end of the third mass 30, so that the guide protrusion 32 may be inserted in the damping space 52. Further, respective ends of the second damping spring 42 may be connected to inner sides of the guide protrusion 32 and the damping space 52. Further, the second damping springs 42 may be disposed on both sides of the guide protrusion 32. That is, the second damping springs 42 may be arranged on both sides of the guide protrusion 32 in the respective damping spaces 52.

Accordingly, as the first mass 10 fitted to the crankshaft of the engine E is rotated by a driving force from the engine E, the second mass rotates relative to the first mass 10. When the torque of the engine E changes, the first damping springs 41 provide an elastic force against rotational displacement of the second mass 20 rotating relative to the first mass 10, so that the torsional vibration transmitted from the engine E can be absorbed and reduced.

In particular, the third mass 30 rotates relative to the second mass 20 in the above operation, and the second damping springs 42 are disposed between a respective guide protrusion 32 and guide 50, so that the second damping springs 42 provide an elastic force in a direction of relative rotation of the third mass 30 to the second mass 20.

Therefore, the second damping springs 42 extend/contract while providing the elastic force in the direction of relative rotation (e.g., rotational direction of the second mass 20), so that the torsional vibration transmitted to the third mass 30 may be absorbed and reduced. Therefore, a low-RPM resonance generated in the power train of an engine E with two or three cylinders can be more effectively improved by the relative rotation of the third mass 30 and the second damping springs 42.

As described above, since the damping springs can absorb the corresponding torsional vibration while the third mass 30 rotates with respect to instantaneous torsional-rotational vibration transmitted to the second mass 20, the torsional vibration from the engine E can be absorbed and reduced, and then transmitted to a transmission.

Therefore, a low-RPM resonance generated in the power train of an engine E with two or three cylinders can be more effectively improved by the damping operation with the relative rotation of the third mass 30.

Further, according to the present disclosure, the third mass 30 can be applied to the structure of a dual mass flywheel, and particularly, the third mass 30 can be mounted to one side of the driving plate 22; therefore, the space for mounting the third mass 30 can be minimized so that the entire length of the transmission is not increased.

According to the present disclosure, since the damping springs absorb the corresponding torsional vibration while the third mass rotates with respect to instantaneous torsional-rotational vibration transmitted to the second mass, the torsional vibration from the engine can be absorbed. Therefore, a low-RPM resonance generated in the power train of an engine with two or three cylinders can be more effectively improved by the damping operation with the relative rotation of the third mass.

The present disclosure has been described in detail with reference to preferred embodiments thereof. However, changes may be made in these exemplary embodiments without departing from the principles and spirit of the disclosure, the scope of which is defined in the appended claims and their equivalents.

What is claimed is:

1. An apparatus for damping of a flywheel, which is configured so that a second mass relatively rotates to a first mass while allowing first damping springs between the first mass and the second mass to extend and contract, the apparatus comprising:
    a guide disposed between the first damping springs and guiding the first damping springs extending/contracting;
    a third mass arranged coaxially with the second mass, formed in the shape of a disk, with one end connected to the guide, and relatively rotating to the second mass;
    a damping space formed inside the guide;
    a guide protrusion formed at an end of the third mass and disposed within the damping space; and
    second damping springs connected to the guide protrusion and to inner sides of the damping space.

2. The apparatus of claim 1, wherein the third mass is mounted to one side of the second mass.

\* \* \* \* \*